US008672408B2

(12) United States Patent
Legras et al.

(10) Patent No.: US 8,672,408 B2
(45) Date of Patent: Mar. 18, 2014

(54) HINGE MECHANISM AND VEHICLE SEAT COMPRISING SUCH A MECHANISM

(75) Inventors: Cédric Legras, La Lande Patry (FR); Julien Talagas, Flers (FR); Benoît Hanriot, Ludres (FR)

(73) Assignee: FAURECIA Sièges d'Automobile, Nanterre (FI)

( * ) Notice: Subject to any disclaimer, the term of this patent is extended or adjusted under 35 U.S.C. 154(b) by 362 days.

(21) Appl. No.: 13/192,825

(22) Filed: Jul. 28, 2011

(65) Prior Publication Data
US 2012/0025586 A1 Feb. 2, 2012

(30) Foreign Application Priority Data

Jul. 29, 2010 (FR) ...................................... 10 56279

(51) Int. Cl.
*B60N 2/02* (2006.01)

(52) U.S. Cl.
USPC ......... 297/362; 297/361.1; 297/374; 475/162

(58) Field of Classification Search
USPC ................ 297/362, 361.1, 367, 374; 475/162
See application file for complete search history.

(56) References Cited

U.S. PATENT DOCUMENTS

| 3,667,804 | A | 6/1972 | Hideaki Yasui et al. |
| 4,025,109 | A | 5/1977 | Klingelhöfer et al. |
| 5,209,637 | A | 5/1993 | Reubeuze |
| 6,619,743 | B1 * | 9/2003 | Scholz et al. ................. 297/362 |
| 6,918,635 | B2 * | 7/2005 | Finner et al. ................. 297/362 |
| 7,090,298 | B2 * | 8/2006 | Lange ........................... 297/362 |
| 7,243,994 | B2 * | 7/2007 | Cha .............................. 297/362 |
| 7,789,464 | B2 * | 9/2010 | Stemmer et al. ............. 297/362 |
| 8,460,145 | B2 * | 6/2013 | Mitsuhashi .................. 475/162 |
| 2004/0258101 | A1 * | 12/2004 | Lange ........................... 370/508 |
| 2005/0099049 | A1 * | 5/2005 | Spey et al. ................. 297/361.1 |
| 2005/0110322 | A1 * | 5/2005 | Cha .............................. 297/362 |
| 2008/0136242 | A1 | 6/2008 | Stemmer et al. |

FOREIGN PATENT DOCUMENTS

| DE | 3819346 A1 | 12/1989 |
| DE | 9211290 | 8/1992 |
| DE | 19850835 A1 | 5/1999 |
| DE | 29921873 U | 12/1999 |
| DE | 1020205060796 A1 | 6/2007 |
| DE | 10-2008 028 068 A1 | 12/2009 |

OTHER PUBLICATIONS

Search report from counterpart French Application No. 1056279 Report dated Jun. 23, 2011.

\* cited by examiner

*Primary Examiner* — Laurie Cranmer
(74) *Attorney, Agent, or Firm* — Miller, Matthias & Hull LLP

(57) ABSTRACT

Hinge mechanism comprising first and second frames rotatably mounted relative to one another, the first frame comprising a collet, a control member rotatably mounted in the collet of the first frame and controlling a relative rotation between the two frames, and a brake unit comprising an operating member connected to the control member with angular play. The brake unit is housed in the collet of the first frame and fitted with a braking member adapted to brake the control member when the operating member is not activated and to allow the operating member to rotationally drive the control member.

9 Claims, 8 Drawing Sheets

HINGE MECHANISM AND VEHICLE SEAT COMPRISING SUCH A MECHANISM

CROSS-REFERENCE TO RELATED APPLICATIONS

This application claims priority under the Paris Convention to the French Patent Application No. 10 56279, filed on Jul. 29, 2010.

FIELD OF THE INVENTION DISCLOSURE

The invention relates to hinge mechanisms and to vehicle seats comprising such mechanisms.

More specifically, the invention concerns a hinge mechanism comprising:
- first and second frames rotatably mounted relative to one another, the first frame comprising an end-plate parallel to the second frame and a collet centered around a first axis perpendicular to said end-plate of the first frame,
- a control member rotatably mounted in the collet of the first frame and adapted to control the relative rotation between the first and second frames,
- a brake unit comprising at least one operating member connected with angular play to the control member and fitted with a braking member adapted to brake the control member when the operating member is not activated and to allow said operating member to drive the control member when said operating member is activated.

BACKGROUND OF THE INVENTION DISCLOSURE

Document DE-A-10 2008 028 086 describes an example of a hinge mechanism of this type, in which the hinge mechanism consists of:
- a first hinge housing comprising the first and second frames connected together by gears,
- and the brake unit, which comprises a second housing laterally attached to the exterior of the first housing.

The drawback of this particularly bulky hinge mechanism is the presence of the second attached housing.

Another similar mechanism is known from document DE102005028779 but the braking arrangement is not designed as a module and is somewhat bulky.

OBJECTS AND SUMMARY OF THE INVENTION DISCLOSURE

The purpose of this invention is to overcome this disadvantage.

To that end, a hinge mechanism of the invention comprises a friction ring which is press-fitted in the collet of the first frame, the brake unit being at least partially contained in the collet.

This avoids an increase in the overall dimensions of the hinge mechanism.

In various embodiments of the hinge mechanism of the invention, one or more of the following arrangements may be used:
- the collet is integrally formed with the first frame;
- the braking member of the brake unit comprises a brake coil spring having a winding which extends between first and second terminating arms, said winding being centered around the first axis and working by friction with a cylindrical friction surface of the friction ring (the ring attached to the collet or a part of the collet) and is centered around the first axis, said friction surface surrounding the brake coil spring, the operating member comprising unlocking stop elements which act on one of the first and second terminating arms in an angular direction corresponding to a decrease in the diameter of the winding when said operating member is activated to rotate around the first axis, and the control member comprising locking stop elements which act on one of the first and second terminating arms in an angular direction corresponding to an increase in the diameter of the winding when said control member is activated to rotate around the first axis without activation of the operating member;
- the operating member is fixed axially to the control member, and the friction ring and brake coil spring are held axially between said operating member and said control member;
- the first and second frames are linked together by a gear unit, and said hinge mechanism also comprises an eccentric cam rotatably mounted in the collet of the first frame, the control member being mounted to rotate around a second axis relative to the second frame, said second axis being parallel to the first axis and distinct from said first axis, and the control member being adapted to rotationally drive the eccentric cam;
- the gear is hypocycloidal;
- the gear comprises first and second circular gear teeth which mutually engage and which are mechanically linked to the first and second frames respectively, said first and second gear teeth being respectively centered around the first and second axis.

Another object of the invention is a vehicle seat comprising first and second parts connected by a hinge mechanism as defined above, the first and second frames being attached, one to the first part and other to the second part. The first and second seat parts may possibly a seat bottom and a backrest. The seat advantageously has first and second sides, with said hinge mechanism being arranged on the first side and the second side of the seat comprising an additional hinge mechanism without a brake unit, said additional hinge mechanism comprising:
- first and second frames mounted to rotate relative to each other, one integrally attached to the seat bottom and the other to the backrest,
- a control member mounted to rotate relative to the first frame of said additional hinge mechanism, said control member being able to control a relative rotation between the first and second frames, said control member of the additional hinge mechanism being rotationally fixed to said control member of the hinge mechanism situated on the first side of the seat.

BRIEF DESCRIPTION OF THE DRAWINGS

Other features and advantages of the invention will become apparent from the following description of one of its embodiments, given as a non-limiting example and represented in the attached drawings.

Concerning the drawings.

DETAILED DESCRIPTION

The same references in the different figures denote identical or similar elements.

Figure 1:
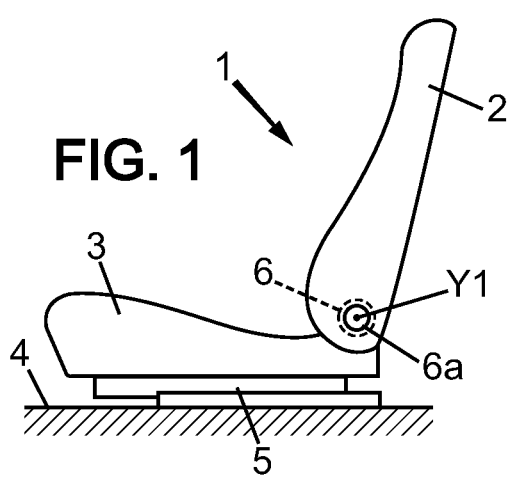
FIG. 1 is a schematic view of a vehicle seat that can be equipped with a hinge mechanism of the invention.
Figure 2:
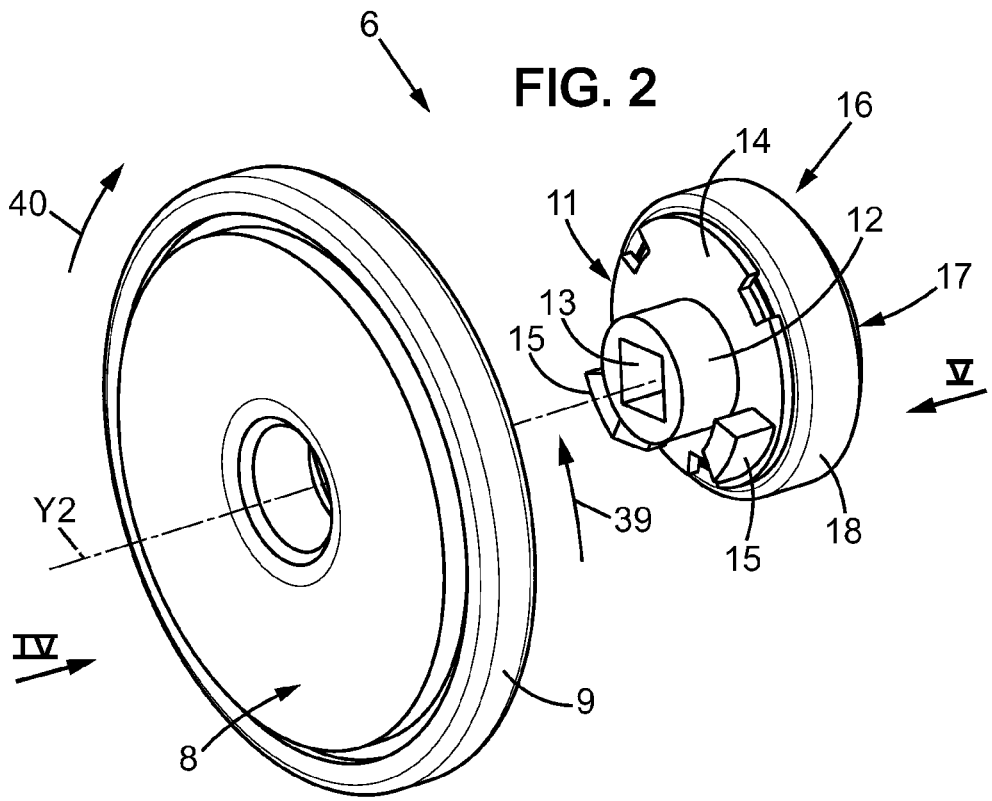
FIGS. 2 and 3 are perspective views of one embodiment of the invention, seen from two opposing directions, showing the hinge mechanism which can be fitted to a first side of the seat in FIG. 1; this hinge mechanism is partially exploded, with its braking module shown outside the collet in which it is normally housed.
Figure 3:
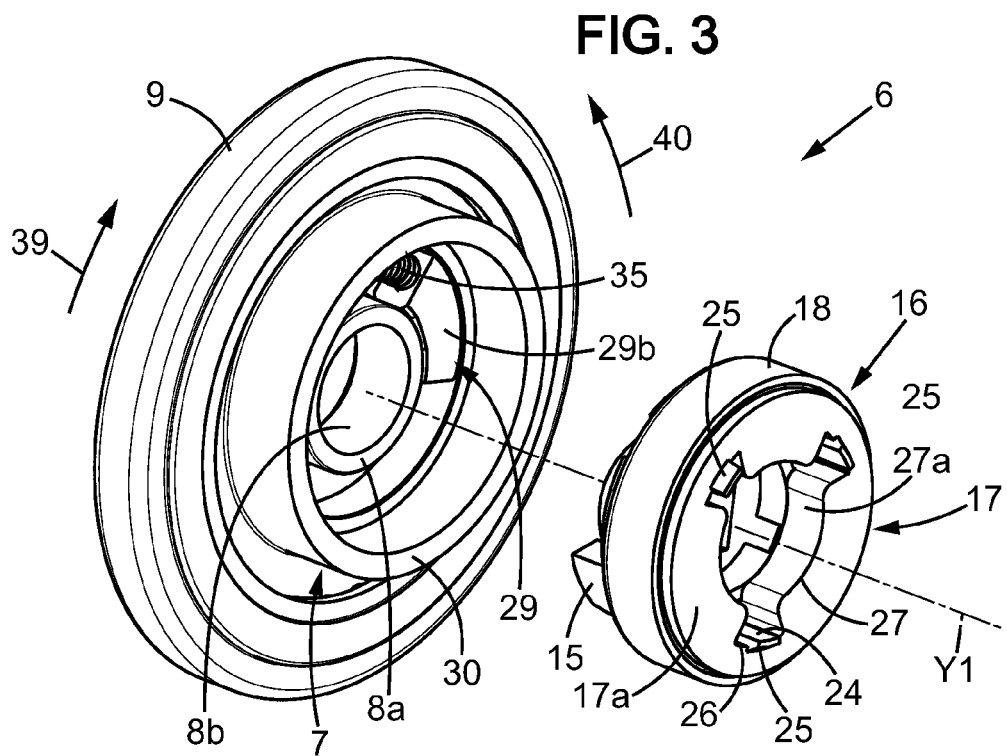
Figure 4:
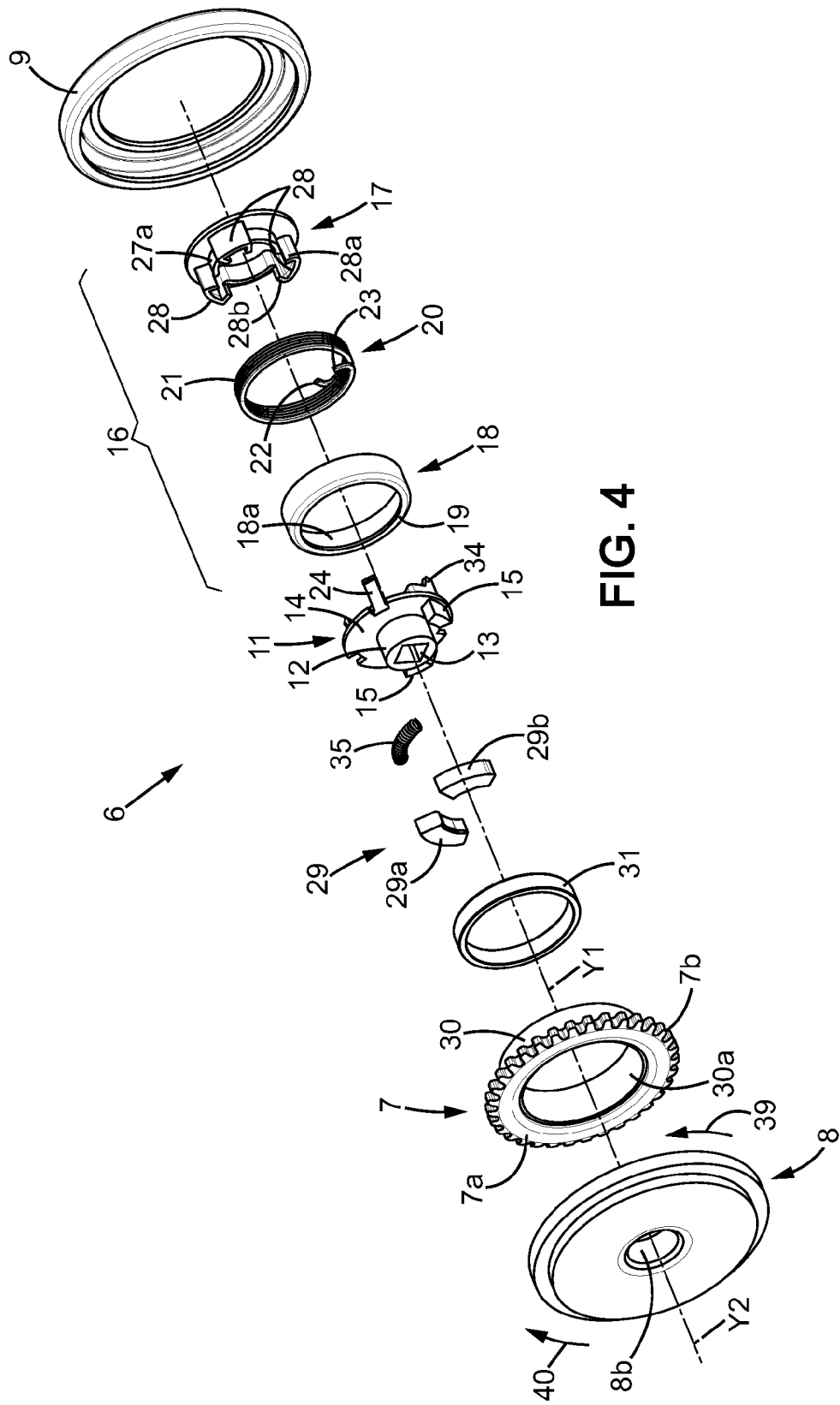
FIGS. 4 and 5 are exploded perspective views of the hinge mechanism in FIG. 2, viewed in the respective directions IV and V in FIG. 2.
Figure 5:
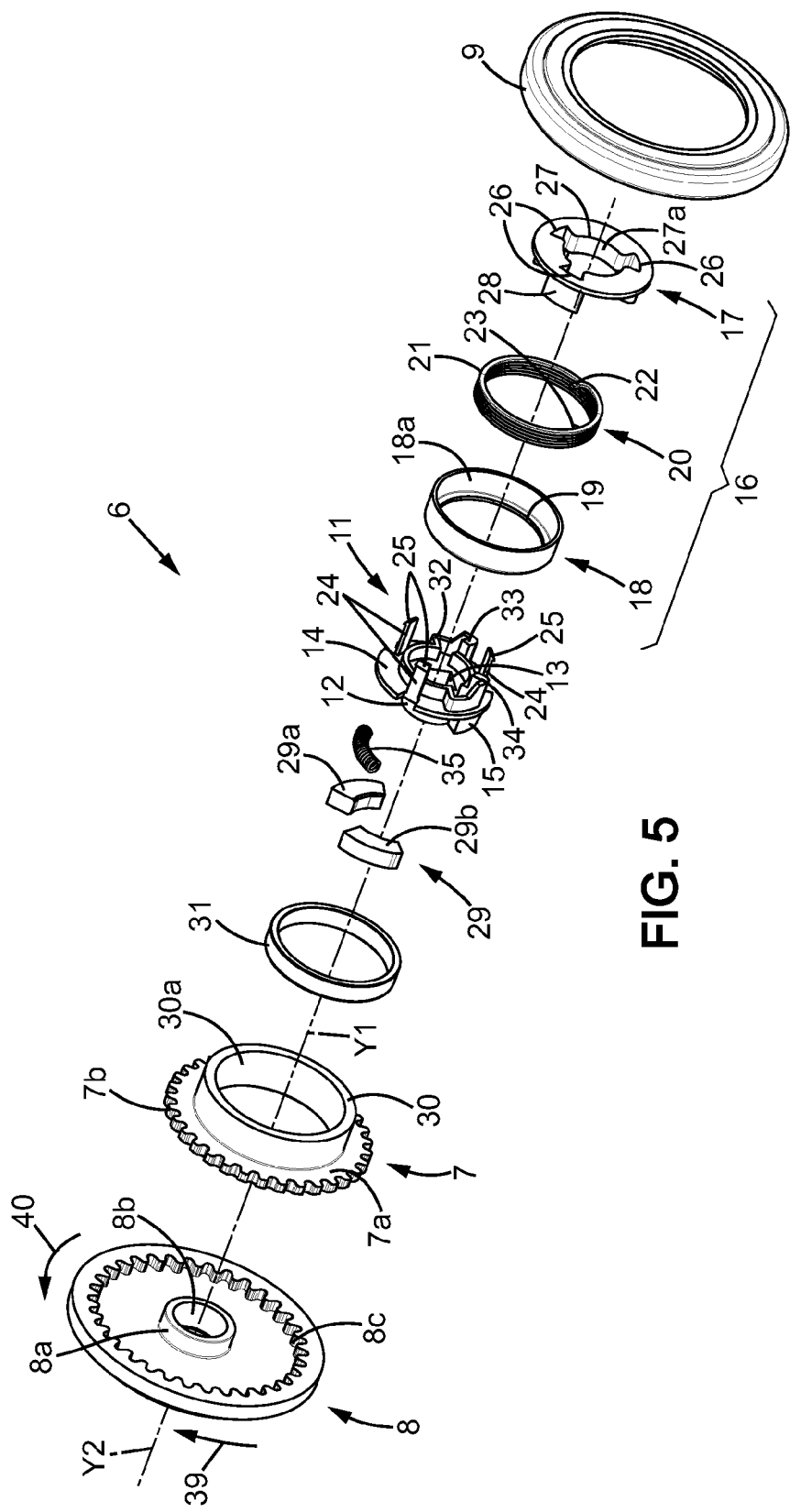

FIG. 1 represents a front seat 1 of an automobile, comprising a backrest 2 mounted to pivot on a seat bottom 3 around an axis Y1, with the seat bottom being mounted on the floor 4 of the vehicle, for example by means of rails 5.

The incline of the backrest 2 is manually adjustable using a button or a pivoting control handle 6a or similar device which drives a geared hinge mechanism 6 (therefore a mechanism which positively controls the rotation of the backrest) situated on one side of the seat. A first embodiment of this is illustrated in FIGS. 2-6, 8, and 9. Alternatively, the hinge mechanism 6 can be driven by a motor or other means instead of the control button. This hinge mechanism 6 can be associated with an additional hinge mechanism 6' which can be situated on the other side of the seat and which will be described below.

The hinge mechanism 6 comprises (see FIGS. 2-6):
- a first frame 7 comprising a first disk-shaped metal end-plate 7a extending in a plane perpendicular to the axis Y1 and which, in the example shown, may be integrally attached to the frame of the seat bottom 3,
- a second frame 8 formed by a second disk-shaped metal end-plate parallel to the first end-plate 7a, said second end-plate 8 being fixed for example to the frame of the backrest 2 (particularly by soldering or another method) and being held against the first end-plate by any known available means, for example by means of a metal locking ring 9 crimped onto said second frame and surrounding the first frame 7 (alternatively, the locking ring 9 can be replaced with a flat ring soldered onto the second frame 8 and surrounding the first frame 7),
- a hypocycloidal gear 10 linking the first and second frames 7, 8 (see FIG. 6),
- and a control member 11, also called a control shaft, which controls the hypocycloidal gear 10.

The control member 11, clearly visible in FIGS. 2-7, can, for example, be a single molded part made of plastic or a light alloy. This input means 11 comprises a central shaft 12 extending longitudinally along a central axis Y2 parallel to the above-mentioned axis Y1 but offset relative to this axis Y1.

The interior of the central shaft 12 may possibly be pierced with an opening 13 that is square-shaped (or ribbed or another shape). The utility of this opening will be seen below.

The end of the central shaft 12 opposite the second end-plate 8 extends radially outwards in a collar 14 parallel to the end-plates 7a, 8. The internal face of the collar 14 extends towards the hypocycloidal gear 10 by at least one stop element 15, and in this example by two stop elements 15 which are pins parallel to the axis Y2 and extending towards the second end-plate 8. The utility of said stop element or elements will be seen below.

The central shaft 12 is cylindrical in shape and its revolution is centered around the axis Y2 and pivots within a bearing which is an integral part of the second end-plate 8 and which is itself centered around the axis Y2. Here, this bearing is formed by a cylindrical passage 8b through the second end-plate 8 and through a collet 8a which is an integral part of this second end-plate. The collet 8a can be formed for example as a single part with the second end-plate 8 and it extends axially from second end-plate 8 towards the first end-plate 7.

In this example, the hypocycloidal gear 10 is a single gear train (but it could also be a planetary hypocycloidal gear train) which for example comprises:
- a first circular gear teeth 7b centered around the axis Y1, with these gear teeth facing radially outwards and formed in the periphery of the end-plate 7a of the first frame,
- a second circular gear teeth 8c formed in the inner face of the second frame 8 and facing radially inwards, said second gear teeth 8c being centered around the axis Y2 and having an internal diameter greater than the external diameter of the first gear teeth 7b,
- and an eccentric cam 29, for example of metal, perpendicular to the axis Y1 and driven by the input device 11; this cam revolves around the collet 8a in a cylindrical housing 30a which is an integral part of the first frame 7 and passes through the end-plate 7a, said housing 30a being centered around the axis Y1. In particular, the cylindrical housing 30a is formed by the smooth and cylindrical inner surface of a metal collet 30 which is rigidly fixed to the end-plate 7a. A gusset (not shown) may possibly be soldered around the collet 30, said gusset being fixed to the frame of the seat bottom 3. As shown in FIGS. 3-7, the collet 30 is integrally formed with the first frame as a single part.

A ring 31 acting as a bearing can be radially interposed when necessary between the eccentric cam 29 and the housing 30a, said ring being press-fitted in place inside the housing 30a.

The control member 11 is rotationally linked to the eccentric cam 29. The rotation of the control member 11 around the second axis Y2 thus rotationally drives the camshaft 29 around the second axis Y2, causing relative rotation between the first and second frames 7, 8.

The cam 29 can be formed of a single part, but in the case considered here, it is made (see FIGS. 4-6) of two wedge-shaped metal half-cams 29a, 29b, each having a radial thickness which increases in the direction of the other half cam. The half-cams 29a, 29b can be relatively rotated between a position of minimum eccentricity (position in which they are closest together) and a position of maximum eccentricity (position in which they are furthest apart).

The half-cams 29a, 29b are elastically forced towards their position of maximum eccentricity by a spring 35, for example a compression spring placed between the two half-cams 29a, 29b. In the rest position of the hinge mechanism, the half-cams 29a, 29b serve to eliminate the internal play in the hypocycloidal gear 10.

The half-cams 29a, 29b could also be replaced by superimposed disk-shaped half-cams, also known to a person skilled in the art.

The hinge mechanism 6 is fitted with a braking module 16 which comprises, in addition to said control member 11:
- an operating member 17 which, as will be explained below, is axially fixed to the control member 11 and is rotatably mounted on the control member 11 with lost motion, with a small play of a few degrees, said control button 6a being fixed to the operating member 17 by any known means (particularly by clip-on or similar means), a metal friction ring 18 which is axially retained between the collar 14 of the control member 11 and a collar 17a of the operating member 17, said friction ring 18 being press-fitted in place inside the internal surface 30a of the collet 30 in order to become an integral part of said collet 30, and said friction ring 18 delimiting an internal cylindrical friction surface 18a centered around the first axis Y1, this friction surface 18a extending axially between an internal shoulder 19 formed by the friction ring 18 and an end opening towards the operating member 17, and a brake coil spring 20 which comprises a winding 21 and first and second terminating arms 22, 23 extending radially inwards, said winding 21 being centered around the first axis Y1 and exerting friction against the friction surface 18a of the friction ring 18, said winding 21 extending in a first angular direction 39 from the first terminating arm 22 to the second terminating arm 23.

The control member 11 comprises retaining lugs 24, for example three in number, which are arranged around the first axis Y1 at a diameter which is less than the diameter of the collar 14. These lugs 24 extend axially from said collar, away from the shaft 12, each terminating in a free end having a hook 25 projecting radially outwards.

The lugs 24 and hooks 25 of the control member 11 are able to be clipped, with backlash, into indentations 26 in a central opening 27 arranged in a collar 17a of the operating member 17.

The central opening 27 in the operating member 17 can be extended axially towards the control member 11 by a substantially annular wall 27a comprising crenellations 28 projecting radially outwards and delimiting said indentations 26.

Figure 9:
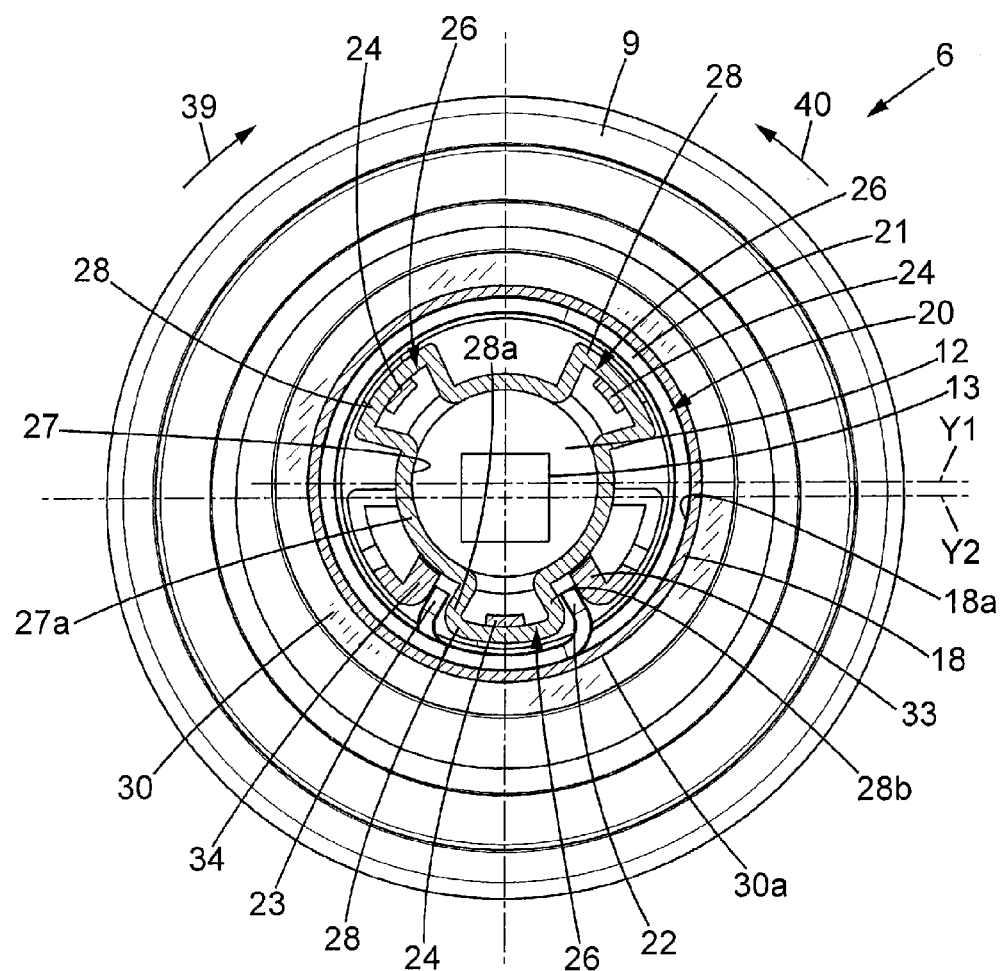

One of these crenellations 28 is arranged between the two terminating arms 22, 23 of the brake coil spring 20, both lateral faces of this crenellation 28 forming unlocking stop elements 28a, 28b which are respectively positioned next to the second terminating arm 23 and the first terminating arm 22 of the brake coil spring (see FIG. 9).

The collar 14 of the control member 11 also comprises an annular wall 32 which extends axially towards the operating member 17 and which comprises the first and second locking stop elements 33, 34 projecting axially towards the operating member 17 and radially outwards relative to the annular wall 32, these first and second locking stop elements 33, 34 respectively bracketing the first and second terminating arms 22, 23 of the friction coil spring 20, as can be seen more clearly in FIG. 9.

Figure 6:
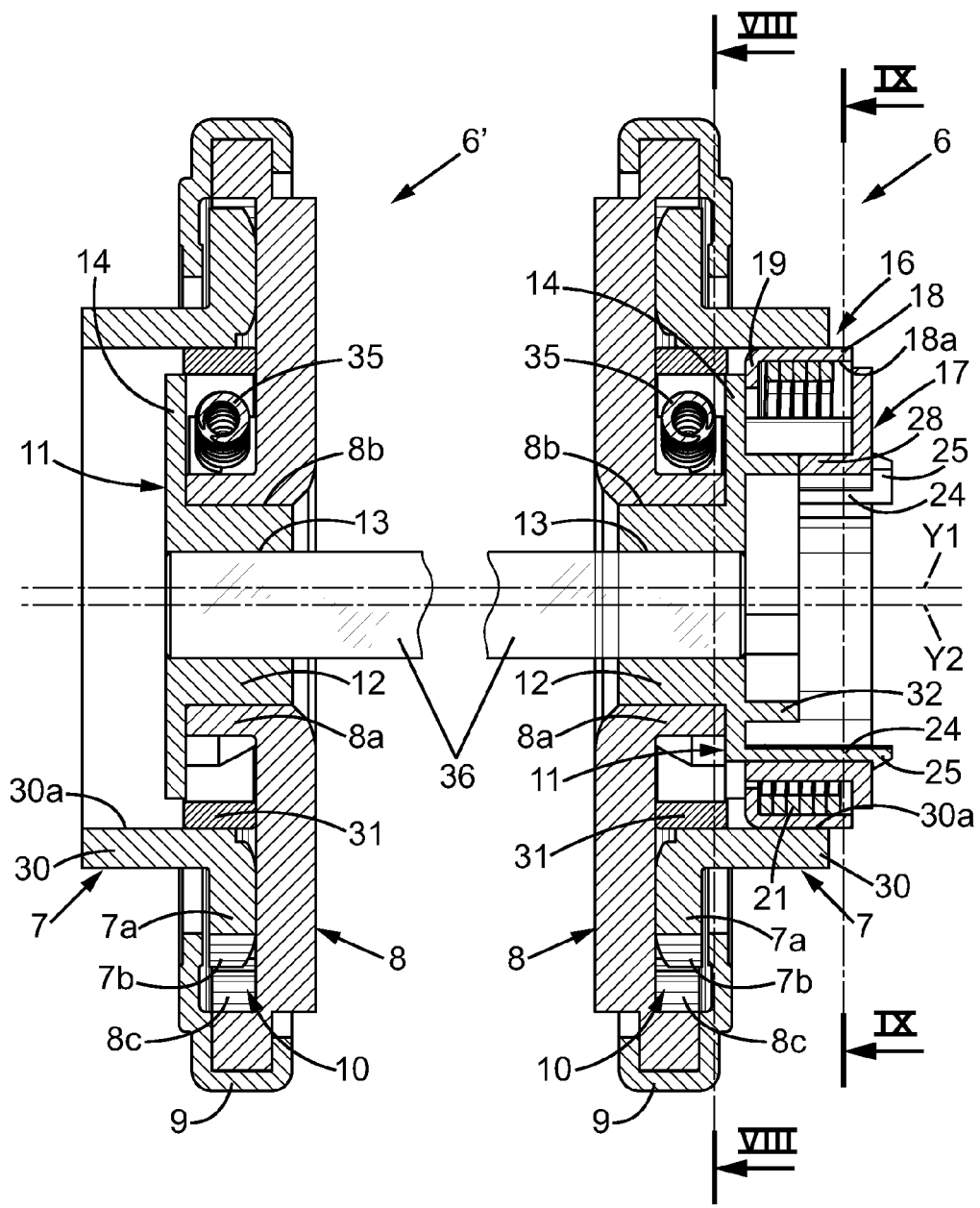
FIG. 6 is an axial cross-sectional view of the hinge mechanism in FIG. 2 and of an additional hinge mechanism situated on a second side of the seat.
Figure 7:
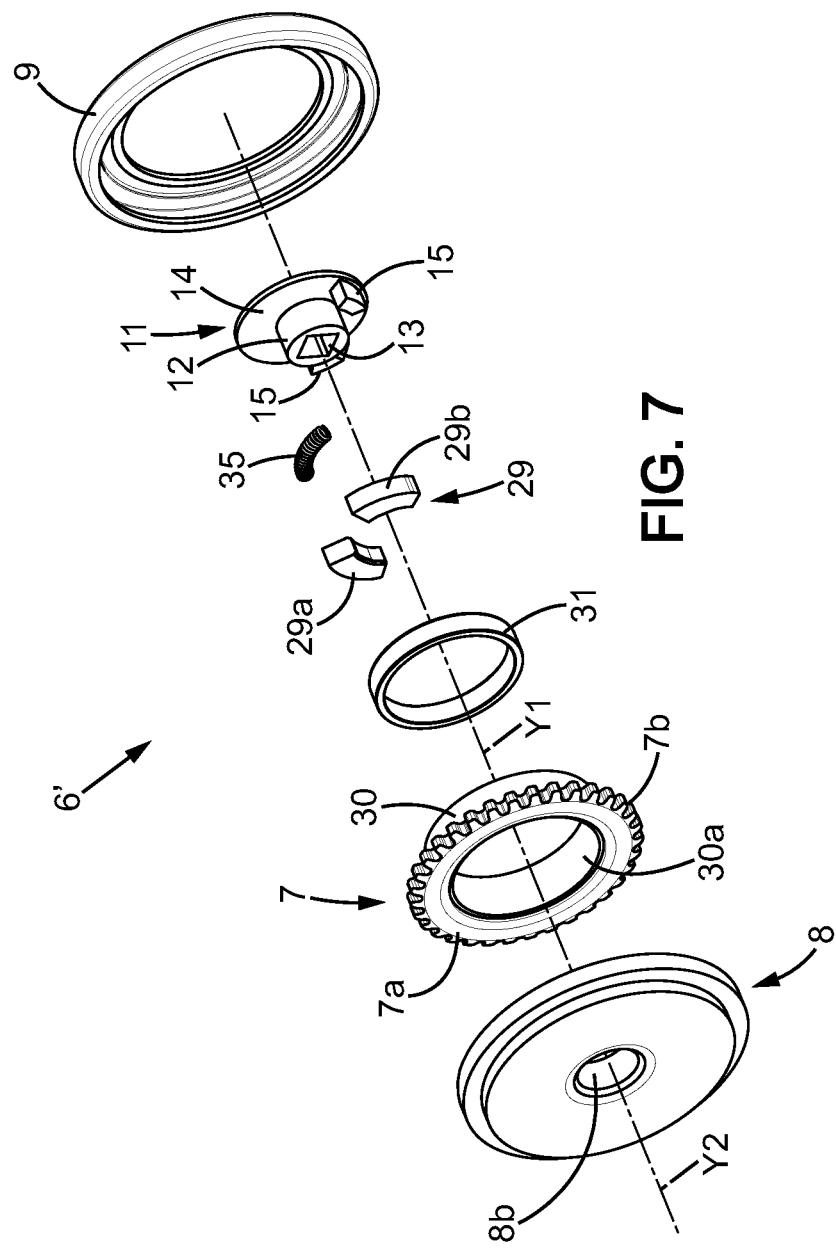
FIG. 7 is a view similar to FIG. 4, showing the additional hinge mechanism.
Figure 8:
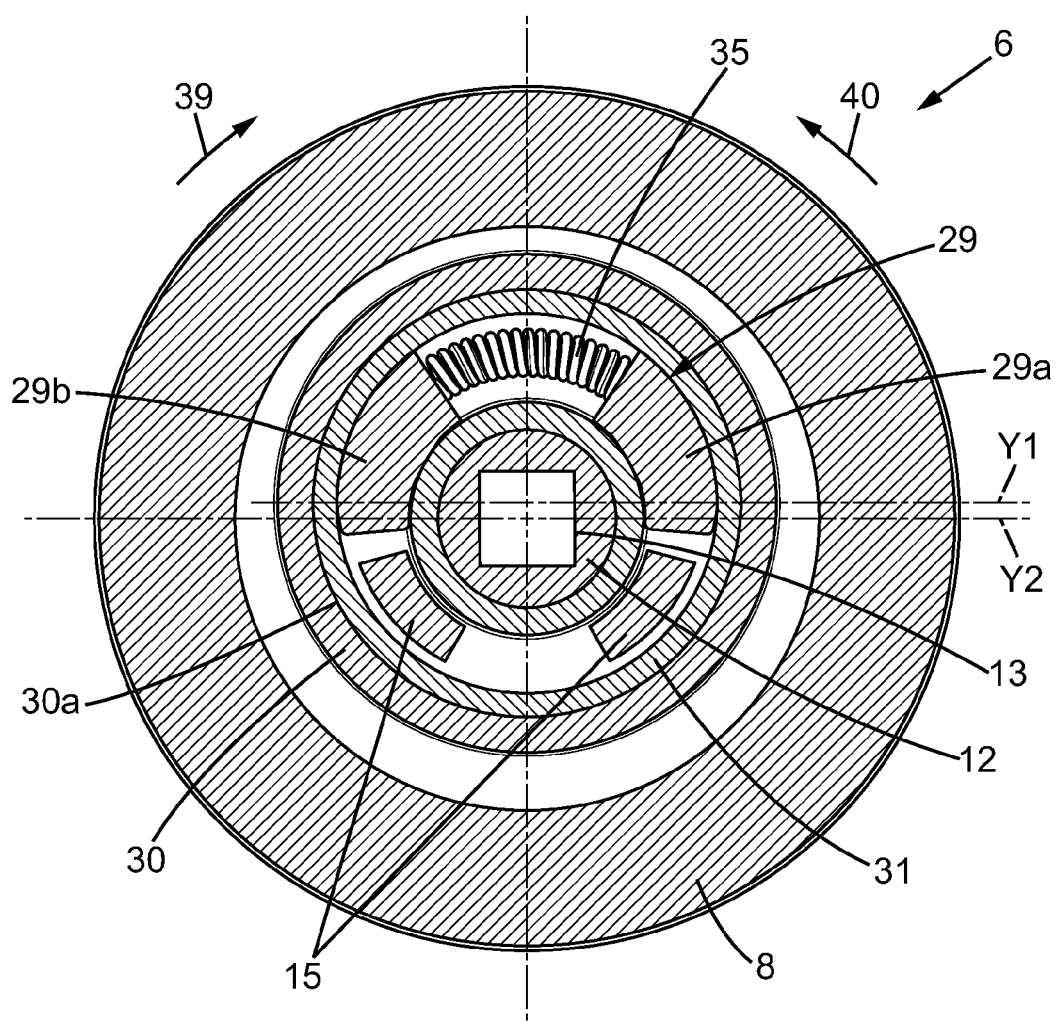
FIGS. 8 and 9 are transverse cross-sectional views of the hinge mechanism in FIG. 2, the cross-sections being viewed along the respective lines indicated as VIII-VIII and IX-IX in FIG. 6.

Finally, as shown in FIG. 6, the control member 11 of the hinge mechanism 6 is rigidly fixed to a rigid connecting rod 36 which is fitted into the opening 13 inside the shaft 12, the end opposite the connecting rod 36 being fitted into the opening 13 inside the shaft 12 of the additional hinge mechanism 6' situated on the other side of the seat. This additional hinge mechanism 6', visible in FIGS. 6 and 7, is similar to the hinge mechanism 6 described above, although it does not include a braking module 16. The control member 11 of the additional hinge mechanism 6' is identical to the control member 11 of the hinge mechanism 6 at least in its portion facing the second frame 8, but the collar 14 of the additional hinge mechanism 6' does not have lugs 24 or an annular wall 32 opposite the second frame 8 (although the control member 11 of the additional hinge mechanism 6' could be completely identical to that of the hinge mechanism 6).

One will note from the above that the braking module 16 uses only one side of the seat while being incorporated with the pre-existing hinge mechanism: this braking module therefore reduces the cost and weight of the seat, while providing a compact hinge mechanism.

In addition, the braking module 16 is in the form of an independent package which can be manufactured and stored separately from the rest of hinge mechanism 6: during the manufacture of hinge mechanisms 6 and 6', this manufacturing can be standardized in the production and assembly of the first and second frames 7, 8, the locking ring 9, and the cam 29, until the installation of either the braking module 16 portion of the hinge mechanism 6, or the control member 11 of the additional hinge mechanism 6'.

The hinge mechanism which has just been described functions as follows.

In the absence of activation of the operating member 17 by the control button 6a, the brake spring 20 blocks the connecting rod 36 and the control devices 11 of both hinge mechanisms 6, 6' by rubbing against the friction surface 18a. If the control member 11 of one of hinge mechanisms 6, 6' is subjected to torque in the first angular direction 39 due to external force applied to the backrest, the first locking stop element 33 acts on the first terminating arm 22 of the brake spring 20 in a direction which tends to increase the diameter of said spring, reinforcing the stopping action of this spring. The same is true for torque in the second angular direction 40 opposite the first direction, as in this case it is the second locking stop element 34 which acts on the second terminal arm 23 of the brake spring 20 in a direction which tends to increase the diameter of said spring.

When a user activates the control member 11 by using said button 6a, in the first angular direction 39, the first unlocking stop element 28a acts on the second terminating arm 23 of the brake spring 20 in a direction tending to decrease the diameter of said spring, which eliminates the stopping action of the brake spring and allows the operating member 17 to drive the control member 11 of both hinge mechanisms 6, 6'. One of the stop elements 15 of each control member 11 then exerts angular pressure against the narrow end of one of the half-cams 29a, 29b, turning the cam 29 within the housing 30a of the collet, driving the gear 10, such that the second frame 8 turns with the backrest 2 relative to the first frame 7 and to the seat bottom 3. The operation is the same, but with the appropriate modifications, when a user activates the control member 11 by means of said button 6a, in the second angular direction 40 (then it is the second unlocking stop element 28b which acts on the first terminating arm 22 of the brake spring).

The invention claimed is:

1. A hinge mechanism comprising:
   first and second frames rotatably mounted relative to one another, the first frame comprising an end-plate parallel to the second frame and a collet centered around a first axis perpendicular to said end-plate of the first frame,
   a control member rotatably mounted in the collet of the first frame and adapted to control the relative rotation between first and second frames,
   a brake unit comprising at least one operating member connected with angular play to the control member and fitted with a braking member adapted to brake the control member when the operating member is not activated and to allow said operating member to drive the control member when said operating member is activated,
   wherein the brake unit comprises a friction ring press-fitted in the collet of the first frame, the brake unit being at least partially contained in the collet.

2. The hinge mechanism according to claim 1, wherein the collet is integrally formed with the first frame.

3. The hinge mechanism according to claim 1, wherein the braking member of the brake unit comprises a brake coil spring having a winding which extends between first and second terminating arms, said winding being centered around the first axis and working by friction with a cylindrical friction surface of the friction ring and is centered around the first axis, said friction surface surrounding the brake coil spring, the operating member comprising unlocking stop elements which act on one of the first and second terminating arms in an angular direction corresponding to a decrease in the diameter of the winding when said operating member is activated to rotate around the first axis, and the control member comprising locking stop elements which act on one of the first and second terminating arms in an angular direction corresponding to an increase in the diameter of the winding when said control member is activated to rotate around the first axis without activation of the operating member.

4. The hinge mechanism according to claim 3, wherein the operating member is fixed axially to the control member, and the friction ring and brake coil spring are held axially between said operating member and said control member.

5. The hinge mechanism according to claim 1, wherein the first and second frames are linked together by gearing, and said hinge mechanism also comprises an eccentric cam rotatably mounted in the collet of the first frame, the control member being mounted to rotate around a second axis relative to the second frame, said second axis being parallel to the first axis and distinct from said first axis, and said control member being adapted to rotationally drive the eccentric cam.

6. The hinge mechanism according to claim 5, wherein the gearing is hypocycloidal and comprises first and second circular gear teeth which mutually engage and which are mechanically linked to the first and second frames respectively, said first and second gear teeth being respectively centered around said first and second axis.

7. A vehicle seat comprising first and second parts connected by a hinge mechanism according to claim 1, the first and second frames being attached, one to the first part and the other to the second part.

8. The vehicle seat according to claim 7, wherein one of the first and second seat parts is a seat bottom and the other is a backrest.

9. The vehicle seat according to claim 8, having first and second sides, wherein said hinge mechanism is arranged on the first side and the second side of the seat comprises an additional hinge mechanism without a brake unit, said additional hinge mechanism comprising:

first and second frames mounted to rotate relative to each other, one integrally attached to the seat bottom and the other to the backrest, a control member mounted to rotate relative to the first frame of said additional hinge mechanism, said control member being able to control a relative rotation between the first and second frames, said control member f the additional hinge mechanism being rotationally fixed to said control member of the hinge mechanism situated on the first side of the seat.

* * * * *